United States Patent [19]

Blizzard et al.

[11] 4,010,136

[45] Mar. 1, 1977

[54] LOW DUROMETER SILOXANE ELASTOMERS CONTAINING POLYTETRAFLUOROETHYLENE POWDER

[75] Inventors: John D. Blizzard; Carl M. Monroe, both of Midland, Mich.

[73] Assignee: Dow Corning Corporation, Midland, Mich.

[22] Filed: June 30, 1975

[21] Appl. No.: 591,906

[52] U.S. Cl. .......................... 260/37 SB; 260/827
[51] Int. Cl.$^2$ ........................................ C08L 83/04
[58] Field of Search ...................... 260/37 SB, 827

[56] References Cited

UNITED STATES PATENTS

| | | | |
|---|---|---|---|
| 2,710,290 | 6/1955 | Safford et al. | 260/827 X |
| 3,192,175 | 6/1965 | Russell | 260/827 X |
| 3,449,290 | 6/1969 | Foster | 260/827 X |

*Primary Examiner*—Lewis T. Jacobs
*Attorney, Agent, or Firm*—George A. Grindahl

[57] ABSTRACT

When a small amount of polytetrafluoroethylene powder is mixed with certain curable polydiorganosiloxane compositions containing a reinforcing silica and an organic peroxide curing agent and the resulting mixture is extruded and heat-cured, the resulting elastomeric article has a durometer of less than 30 and has a greatly reduced amount of porosity or bubbles.

14 Claims, No Drawings

LOW DUROMETER SILOXANE ELASTOMERS CONTAINING POLYTETRAFLUOROETHYLENE POWDER

BACKGROUND OF THE INVENTION

1. Field of the Invention

This invention relates to polyorganosiloxane compositions containing polytetrafluoroethylene powder and to the elastomeric articles obtained from curing said compositions. More particularly, this invention relates to curable polyorganosiloxane compositions containing less than one percent by weight of polytetrafluroethylene powder and to the cured elastomeric articles having greatly reduced porosity, fewer surface irregularities and a low durometer that are obtained by extruding and heat-curing said compositions.

2. Description of the Prior Art

Low durometer polyorganosiloxane elastomers have many useful applications. Several methods of obtaining a low durometer in polyorganosiloxane elastomers have been revealed. One method involves adding a nonfunctional low molecular weight polydimethylsiloxane fluid to the composition before curing the composition. Norbert G. Dickmann, U.S. Pat. No. 2,819,236 teaches the addition of certain fluids bearing silicon-bonded alkyl, phenyl and vinyl radicals to the uncured compositions. It is also well known to obtain a cured composition of low durometer by reducing the silica filler content in the uncured composition.

All of these known methods have shortcomings. In particular, it is well known that when the amount of silica filler in a polyorganosiloxane composition is greatly reduced the composition becomes sticky and difficult to extrude in a smooth, uniform shape. Furthermore, a curable, low-silica composition is more prone to contain small bubbles after it has been extruded and heat-cured; an undesirable result generally known as porosity.

It is known to mix polytetrafluoroethylene powder with curable polyorganosiloxane compositions to obtain better strength in the cured compositions and/or better handling properties in the uncured composition. (U.S. Pat. Nos. 2,710,290, 2,927,908, 3,132,116, 3,449,290, and Canadian Pat. No. 567,259). However, nothing has been taught regarding the use of small amounts, for example, less than 1 percent by weight, of a polytetrafluoroethylene powder in curable polyorganosiloxane compositions as a means of greatly reducing the porosity of the extruded, heat-cured composition.

SUMMARY OF THE INVENTION

It is a primary object of this invention to provide a novel polyorganosiloxane composition which can be extruded and heat-cured to provide elastomeric articles characterized by lower porosity, a low durometer and a smoother surface. It is another object of this invention to provide cured elastomeric articles having a durometer of less than 30, relatively low porosity and a relatively smoother surface when formed by the process of extruding and heat-curing.

This invention relates to a composition comprising (a) a polydiorganosiloxane gum, (b) a high-surface area reinforcing silica filler, preferably bearing an anti-crepe-hardening silica surface treatment, and (c) a small amount of polytetrafluoroethylene powder. This invention further relates to said compositions containing, in addition to the components recited, an organic peroxide curing agent, and to the cured articles obtained by heating said compositions.

It was unpredictable that the addition of polytetrafluoroethylene powder to certain polyorganosiloxane compositions that are curable to form a low durometer elastomer would markedly reduce the porosity of the extruded, heat-cured composition without appreciably increasing the durometer of the cured composition.

For the purposes of this invention the durometer of the cured compositions is measured according to ASTM D-2240 on the composition that has been press-cured at 116° C. for 5 minutes using 0.5 percent by weight, based on the weight of the completed composition of 2,4-dichlorobenzoyl peroxide as the curing agent.

DESCRIPTION OF THE INVENTION

The present invention relates to a composition consisting essentially of (a) 100 parts by weight of a polydiorganosiloxane gum having a Williams plasticity of from 0.040 to 0.100 inches and having an average of from 1.999 to 2.001 organic radicals per silicon atom, at least 95 percent of the organic radicals being methyl, any remaining organic radicals being selected from the group consisting of 3,3,3-trifluoropropyl and monovalent hydrocarbon radicals having from 1 to 6 carbon atoms, no more than 0.1 percent of all organic radicals in (a) having aliphatic unsaturation, said gum being endblocked with radicals selected from the group consisting of silicon-bonded hydroxyl radicals and silicon-bonded vinyl radicals, (b) from 15 to 25 parts by weight of a reinforcing silica filler having a surface area of at least 50 square meters per gram, (c) from 0.3 to 1.0 parts by weight, for every 100 parts by weight of the total of (a) plus (b) of a polytetrafluoroethylene powder having an average particle diameter of less than 1,000 microns, and (d) from 0 to 3.0 percent by weight, based on the total weight of said composition, of an organic peroxide curing agent.

Polydiorganosiloxane gum (a) is a soluble, high viscosity material having a Williams plasticity of from 0.040 to 0.100 inches, preferably 0.055 to 0.075 inches, as measured by ASTM D-926-67. By soluble it is meant that the gum can be dissolved in benzene or toluene. Said gum consists essentially of linear siloxane chains of diorganosiloxane units of one or more types, for example dimethylsiloxane units alone or in combination with phenylmethylsiloxane units, and is endblocked with radicals which are selected from the group consisting of silicon-bonded hydroxyl and silicon-bonded vinyl. The organic groups of said diorganosiloxane units are selected from the group consisting of 3,3,3-trifluoropropyl and monovalent hydrocarbon radicals, each having from 1 to 6 carbon atoms, such as methyl, ethyl, isopropyl, butyl, cyclohexyl, vinyl, allyl, and phenyl, at least 95 percent of all said radicals being methyl and no more than 0.1 percent of all said radicals having aliphatic unsaturation. The ratio of organic radicals to silicon atoms in polydiorganosiloxane gum (a) has a value of from 1.999 to 2.001. It is to be understood that polydiorganosloxane gum (a) can be a homopolymer or a copolymer or a mixture of homopolymers and/or copolymers. Furthermore, polydiorganosiloxane gum (a) can have endblocking radicals that are only hydroxyl or only vinyl or mixtures of vinyl and hydroxyl. While polydiorganosiloxane gum (a) is described as being essentially linear and soluble, it is to be understood that said gum can have incorporated therein trace amounts of $R_3SiO_{1/2}$ units, $RSiO_{3/2}$ units, and $SiO_{4/2}$ units that are normally present in commercial polydiorganosiloxanes, where R is any of the organic radicals defined above.

Polydiorganosiloxane gums (a) are well known in the art and may be produced by any suitable method for the preparation of soluble, hydroxy-endblocked or vinyl-endblocked polydiorganosiloxanes of high viscosity. They can be produced by one skilled in the art merely by following the teachings of the voluminous literature available; many are commercially available.

A preferred polydiorganosiloxane gum (a) for the compositions of this invention is a vinyl-endblocked and/or hydroxyl-endblocked polydiorganosiloxane having a Williams plasticity of from 0.055 to 0.075 inches wherein from 0.01 to 0.05 of all organic radicals in (a) are vinyl.

Another preferred polydiorganosiloxane gum (a) for the compositions of this invention is a vinyl-endblocked and/or hydroxyl-endblocked polydimethylsiloxane having a Williams plasticity of from 0.055 to 0.075 inches. When such a gum having no vinyl groups or only terminal vinyl groups is used, it is preferred to add to the compositions of this invention a vinylcontaining copolymer fluid. This copolymer fluid is an essentially linear, endblocked polydiorganosiloxane fluid having a viscosity of less than 100,000, preferably from 5,000 to 50,000 centipoise at 25° C. and consisting essentially of dimethylsiloxane units and methylvinylsiloxane units. By essentially linear it is meant that no more than trace amounts of $CH_3SiO_{3/2}$ units, $CH_2=CHSiO_{3/2}$ units and $SiO_{4/2}$ units are present in said fluid. In addition to dimethylsiloxane units and methylvinylsiloxane units, the copolymer fluid has endblocks selected from the group consisting of hydroxyl, vinyl or any of the organic radicals as defined above for component (a).

Copolymer fluids are well known in the art. Any method suitable for the preparation of endblocked polydiorganosiloxane copolymer fluids can be used for their preparation.

The reinforcing silica (b) can be any of the high-surface area, finely divided silicas known as fume silicas and silica aerogels and being characterized by an average particle diameter of from 5 to 50 millimicrons and having a surface area of from 50 to 500 and more square meters per gram. Preferred in this invention are those silicas whose surface area has a value of from approximately 200 to 400 square meters per gram. A preferred embodiment of this invention is a composition having resistance to the undesirable phenomenon known as crepe-hardening, comprising a reinforcing silica having a surface area of from 200 to 400 square meters per gram and having attached to the surface thereof, an anticrepe-hardening agent for silica surface treatment, for example, trimethylsiloxane units or a short-chain hydroxyl-endblocked polydiorganosiloxane fluid. Such silicas, known as treated silicas, are well known in the art. It is within the scope of this invention to treat the silicas either prior to or during the preparation of the organosilicon compositions in the well known manner.

Polytetrafluoroethylene powder (c) is a finely divided solid material with an average particle diameter of less than 1,000 microns, preferably from 350 to 650 microns. Polytetrafluoroethylene powders are commercially available, one example of which is sold by E. I. duPont de Nemours of Wilmington, Del. under the trade name of Teflon 6C.

The compositions of this invention are curable with heat to form elastomeric articles whenever they contain an organic peroxide curing agent (d). Suitable for use in curing the compositions of this invention are the organic peroxides that are commonly used in the silicone art such as 2,4-dichlorobenzoyl peroxide, dicumyl peroxide, di-tertiary-butyl peroxide and tertiary-butyl perbenzoate.

In addition to the components listed above, the compositions of this invention may contain additives which are well known in the art such as antioxidants, pigments, compression-set additives, heat-stability additives, and the like as long as the durometer and the porosity of the cured compositions are not appreciably increased as a result of adding said additives.

For every 100 parts by weight of polydiorganosiloxane gum (a) there is present in the compositions of this invention, from 15 to 25 parts by weight, exclusive of any anticrepe-hardening silica surface treatment, of a reinforcing silica filler (b). The amount of silica is narrowly restricted. To use less than the indicated amount of silica results in compositions that are excessively sticky in the uncured state and/or cured compositions that have inferior physical properties. More than the indicated amount of silica will result in a composition which, when cured, will have an undesirably high durometer. When untreated silica is employed in the compositions of this invention, the amount to be used is determined simply by measuring the exact amount of silica that is desired. When a pretreated silica, bearing an anticrepe-hardening silica surface treatment, is used the amount of the pretreated silica that is employed must be corrected for the weight of surface treatment, in order to obtain the desired amount of silica. The weight of the surface treatment is commonly determined by simple elemental analysis, preferably carbon analysis, of the treated silica. The copolymer fluid when added to the compositions of this invention, serves to increase the tear strength of the cured composition. The copolymer fluid may be used in quantities of up to 10 parts by weight for every 100 parts by weight of gum (a), beyond which an undesirable increase in the durometer of the cured composition is incurred.

The amount of polytetrafluoroethylene powder that is used in the compositions of this invention is narrowly restricted. The use of less than 0.3 parts by weight for every 100 parts by weight of (a) plus (b) of polytetrafluoroethylene powder will not lead to the dramatic reduction in porosity of the extruded, cured, low durometer compositions that is the essence of this invention. The use of amounts greater than 1.0 parts by weight of polytetrafluoroethylene powder for every 100 parts by weight of (a) plus (b) is uneconomical and serves to undesirably increase the durometer of the cured composition.

The amount of organic peroxide curing agent (d) to be used in the compositions of this invention is not narrowly critical. Thus, the compositions of this invention may contain from 0 to 3 percent by weight based on the weight of the complete composition, of a curing agent such as 2,4-dichlorobenzoyl peroxide. The compositions of this invention may be prepared free of organic peroxide curing agent and subsequently for example, just prior to or during extruding of the composition, be mixed with said curing agent. Said peroxide-free compositions are within the scope and spirit of this invention. Certain compositions, for example, compositions to be used in medical applications, may require a low level of curing agent, while other compositions, for example, compositions to be used in applications requiring a greater degree of cure, may require a high level of curing agent. It is preferred to use from about 0.3 to about 2.0 percent by weight, based on the weight of the complete composition, of curing agent (d), to cure the compositions of this invention.

The compositions of this invention are obtained whenever components (a), (b), (c), and optionally (d) are mixed together. Mixing can be accomplished by any suitable method such as milling, blending, etc. Said mixing can be conducted, if desired, in the presence of one or more organic solvents such as are commonly used in the organosilicon art. The polytetrafluoroethylene powder can be mixed in the dry form or as a dispersion in a liquid such as water or organic solvent.

There is no critical order of mixing of the components of this invention although it is preferred to add any organic peroxide curing agent last. It is most convenient to admix the silica filler and the polytetrafluoroethylene powder, in any order or simultaneously, with the mixture of polydiorganosiloxane gum (a) and, if any, copolymer fluid. As suggested above, the organic peroxide curing agent can be mixed with the compositions of this invention when said compositions are being prepared or at a later time, for example, immediately prior to the time of the shaping and heat-curing of the compositions. It is within the scope of this invention to mix the organic peroxide curing agent with the curable compositions as a part of an extruding process in the conventional manner. Any additional known additives for silicone elastomers such as antioxidants, compression set additives and pigments, may be mixed with the recited components of the compositions of this invention at any suitable time prior to forming and curing the elastomeric article.

The compositions of this invention, when containing an organic peroxide curing agent, may be cured in any suitable manner. It is desirable to cure the extruded composition with hot air, at a temperature of from about 100° C. to about 170° C., whereupon a curing is achieved in 15 minutes or less. Post curing of the cured composition can then be conducted, if desired, for from 4 to 24 hours at temperatures of up to 250° C.

It is to be understood that while this invention is directed to extruding and to extrudable compositions, the compositions of this invention can be formed by any other suitable method which is common in the silicone rubber art such as compression molding, injection molding and transfer molding. The compositions of this invention can be cured by methods other than hot air, such as by heated molds and platens, infrared radiation, hot fluid curing, steam curing and the like.

The best method to practice this invention is to form an appropriate mixture of (a), copolymer fluid, if any, and if preferred, anticrepeing, silica treating agent, and then add the indicated amount of silica to the resulting mixture. The mixture containing the silica is preferably preliminarily heated for an hour or more at 150°–250° C. and then volatile material is removed at reduced pressure. Thereafter the indicated amount of polytetrafluoroethylene powder is admixed with the devolatilized mixture. Alternatively, the polytetrafluoroethylene powder can be admixed prior to the heating and devolatilization step. The resulting composition of (a), (b), and (c) should be cooled to a temperature less than the minimum curing temperature, preferably to room temperature, and then the organic peroxide curing agent is admixed. The resulting composition is stable at room temperature and below and is instantly ready for extruding to form a desired article and heating of said article to provide a cured elastomeric article characterized by a durometer of less than 30, markedly reduced porosity and a smoother and more uniform surface. The curable compositions of this invention are particularly useful in the fabrication of soft, elastomeric articles such as medical devices such as catheters and oxygen hoses and for the fabrication of sealing gaskets and the like.

The following examples serve to further illustrate the present invention but should not be construed as limiting the invention which is properly delineated by the appended claims. All parts are parts by weight. Durometer was measured according to ASTM D-2240. Tensile strength and elongation were measured according to ASTM D-412. Tear strength (Die B) was measured according to ASTM D-624. Williams plasticity was measured according to ASTM D-926-67.

EXAMPLE 1

A dough mixer was charged with 100 parts of a benzene-soluble polydimethylsiloxane having hydroxyl endblocks and vinyl endblocks and having a Williams plasticity of approximately 0.06 inches. The mixer was further charged with 3 parts of a vinyldimethylsiloxane-endblocked copolymer fluid having 78 mol percent of dimethylsiloxane units and 22 mol percent of methylvinylsiloxane units and having a viscosity of approximately 15,000 centipoise at 25° C., 8 parts of hexamethyldisilazane, 3 parts of water and 20 parts of a fume silica having a surface area of approximately 400 sq.m./gm. The components in the dough mixer were thoroughly mixed, heated at 175° C. for 3 hours and devolatilized at reduced pressure. One hundred parts of the devolatilized mixture was transferred to a two-roll rubber compounding mill and 1.0 part, based on the weight of the transferred mixture of a 50 percent by weight solution of 2,4-dichlorobenzoyl peroxide in silicone oil was milled into the mixture. A second one hundred parts of the devolatilized mixture was treated identically as the first sample except 0.5 parts, based on the weight of the transferred mixture, of a polytetrafluoroethylene powder having a particle diameter of from 350 to 650 microns was also milled into the sample. The physical properties of the first sample after press-curing for 5 minutes at 116° C. were as follows: Durometer = 20, Tensile = 52.8 kg./sq.cm., Elongation = 920 percent, Tear = 15.2 kg./cm. The physical properties of the second sample after press-curing at 116° C. for 5 minutes were as follows: Durometer = 21, Tensile = 55.6 kg./sq.cm., Elongation = 870 percent, Tear = 27.0 kg./cm. Both uncured samples were extruded from a circular die having a diameter of approximately 1.27 cm., and the extrudate was heat-cured with hot air. The first sample (without polytetrafluoroethylene powder) gave a poor extrusion characterized by a rough, worm-like, segmented outer surface, while the second sample (containing polytetrafluoroethylene powder) gave an excellent extrusion having a smooth, cylindrical shape. Both cured extrudates were sectioned perpendicularly to their long axis to expose equivalent cross sections. The first sample contained numerous voids of varying size in its cross section (commonly called porosity) while the second sample (containing polytetrafluoroethylene powder) was nearly free of voids.

EXAMPLE 2

When the 100 parts of gum of Example 1 is substituted by 100 parts of a benzene-soluble, hydroxylendblocked polydimethylsiloxane having a plasticity of 0.070 inches, or 100 parts of a benzene-soluble, vinylendblocked polydimethylsiloxane having a plasticity of 0.055 inches, and the resulting compositions are identically extruded, cured and tested, equivalent results are obtained.

EXAMPLE 3

The preparation of the polytetrafluoroethylene-containing sample of Example 1 was repeated except that the appropriate amount of polytetrafluoroethylene powder was added to the composition in the dough mixer simultaneously with the silica and the appropriate amount of 2,4-dichlorobenzoyl peroxide was added to the composition in the dough mixer after the polyterafluoroethylene-containing composition had been devolatilized and cooled to room temperature. A material essentially identical with the corresponding sample of Example 1, with respect to extrudability, porosity, durometer and other measured physical properties, was obtained.

EXAMPLE 4

A dough mixer was charged with 100 parts of a benzene-soluble polydiorganosiloxane gum consisting essentially of approximately 0.04 mol percent of methylvinylsiloxane units and the remaining units being dimethylsiloxane units, said gum having endblocks of hydroxyl radicals and vinyl radicals and having a Williams plasticity of approximately 0.060 inches. The mixer was further charged with 7.5 parts of a anticrepe-hardening, silica-treating agent consisting essentially of a hydroxyl-endblocked polydiorganosiloxane of less than 10 polydiorganosiloxane units per molecule and having diphenylsiloxane units, dimethylsiloxane units and methylvinylsiloxane units. To the above mixture was added 20 parts of a fume silica having a surface area of approximately 400 sq.m./gm. and 0.64 parts of polytetrafluoroethylene powder, known under the trade name Teflon 60. The total mixture was heated at 175° C. for 3 hours and devolatilized at reduced pressure. The devolatilized mixture was cooled and 1.28 parts of a 50 percent by weight solution of 2,4-dichlorobenzoyl peroxide in silicone oil was admixed using a two-roll rubber compounding mill. The resulting curable composition was treated as in Example 1. The cured composition had a durometer of 22 after being press-cured at 116° C. for 5 minutes and post-cured for 4 hours at 200° C., and a greatly reduced porosity after being extruded and heat-cured with hot air.

That which is claimed is:
1. A composition consisting essentially of,
    a. 100 parts by weight of polydiorganosiloxane gum having a Williams plasticity of from 0.040 to 0.100 inches and having an average of from 1.999 to 2.001 organic radicals per silicon atom, at least 95 percent of the organic radicals being methyl, any remaining organic radical being selected from the group consisting of 3,3,3-trifluoropropyl and monovalent hydrocarbon radicals having from 1 to 6 carbon atoms, no more than 0.1 percent of all organic radicals in (a) having aliphatic unsaturation, said gum being endblocked with radicals selected from the group consisting of silicon-bonded hydroxyl radicals and silicon-bonded vinyl radicals,
    b. from 15 to 25 parts by weight of a reinforcing silica filler having a surface area of at least 50 square meters per gram,
    c. from 0.3 to 1.0 parts by weight, for every 100 parts by weight of the total of (a) plus (b) of a polytetrafluoroethylene powder having an average particle diameter of less than 1,000 microns and,
    d. from 0 to 3.0 percent by weight, based on the total weight of said composition of a organic peroxide curing agent.

2. The composition of claim 1 wherein the organic peroxide curing agent is present in from 0.3 to 2.0 percent by weight.

3. The composition of claim 1 wherein the polydiorganosiloxane gum is a polydimethylsiloxane having hydroxyl endblocks and vinyl endblocks and having a Williams plasticity of from approximately 0.055 to approximately 0.075 inches, and a copolymer fluid is present in approximately 3 parts by weight for every 100 parts by weight of gum, said copolymer fluid consisting essentially of dimethylsiloxane units and methylvinylsiloxane units and having vinyl endblocks and having a viscosity of from 5,000 to 50,000 centipoise at 25° C.

4. The composition of claim 3 wherein the silica has a surface area of from 200 to 400 square meters per gram, the surface of said silica bearing an anticrepe-hardening agent for silica surface treatment.

5. The composition of claim 4 wherein the organic peroxide curing agent is present in from approximately 0.3 to approximately 2.0 percent by weight.

6. The composition according to claim 1 wherein (a) has a Williams plasticity of from 0.055 to 0.075 inches and from 0.01 to 0.05 percent of all organic radicals in (a) are vinyl radicals.

7. The composition according to claim 6 wherein the silica has a surface area of from 200 to 400 square meters per gram, the surface of said silica bearing an anticrepe-hardening agent for silica surface treatment and the organic peroxide curing agent is present in from approximately 0.3 to approximately 2.0 percent by weight.

8. A cured elastomer obtained by heating the composition of claim 2.

9. A cured elastomer obtained by heating the composition of claim 5.

10. A cured elastomer obtained by heating the composition of claim 7.

11. The composition of claim 5 wherein the anticrepe-hardening agent for silica surface treatment is hexamethyldisilazane.

12. A cured elastomer obtained by heating the composition of claim 11.

13. The composition of claim 7 wherein the anticrepe-hardening agent for silica surface treatment consists essentially of a hydroxyl-endblocked polydiorganosiloxane of less than 10 polydiorganosiloxane units per molecule and having diphenylsiloxane units, dimethylsiloxane units and methylvinylsiloxane units.

14. A cured elastomer obtained by heating the composition of claim 13.

* * * * *